United States Patent
Parga-Cacheiro et al.

(10) Patent No.: US 9,917,449 B2
(45) Date of Patent: Mar. 13, 2018

(54) METHOD FOR CONNECTING MULTIPLE BATTERY CELLS OF A BATTERY AND BATTERY SYSTEM HAVING A BATTERY WITH MULTIPLE BATTERY CELLS AND MULTIPLE BATTERY-CELL-MONITORING MODULES WHICH ARE RESPECTIVELY ASSIGNED TO A BATTERY CELL

(71) Applicant: Robert Bosch GmbH, Stuttgart (DE)

(72) Inventors: Jose-Luis Parga-Cacheiro, Backnang (DE); Philipp Hillenbrand, Neuffen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/506,163

(22) PCT Filed: Jul. 30, 2015

(86) PCT No.: PCT/EP2015/067467
§ 371 (c)(1),
(2) Date: Feb. 23, 2017

(87) PCT Pub. No.: WO2016/030119
PCT Pub. Date: Mar. 3, 2016

(65) Prior Publication Data
US 2017/0271890 A1    Sep. 21, 2017

(30) Foreign Application Priority Data
Aug. 25, 2014 (DE) .................. 10 2014 216 879

(51) Int. Cl.
*H02J 7/00* (2006.01)
(52) U.S. Cl.
CPC .......... *H02J 7/0019* (2013.01); *H02J 7/0016* (2013.01); *H02J 7/0021* (2013.01)

(58) Field of Classification Search
CPC ....... H02J 7/0016; H02J 7/0019; H02J 7/0021
(Continued)

(56) References Cited

U.S. PATENT DOCUMENTS 9,362,760 B2 * 6/2016 Butzmann ................ B60L 3/12
2010/0261048 A1 10/2010 Kim et al.
(Continued)

FOREIGN PATENT DOCUMENTS

| DE | 102011002548 | 7/2012 |
| DE | 102011075376 | 11/2012 |
| DE | 102013201489 | 8/2014 |

OTHER PUBLICATIONS

International Search Report for Application No. PCT/EP2015/067467 dated Oct. 12, 2015 (English Translation, 2 pages.

*Primary Examiner* — Edward Tso
*Assistant Examiner* — Aaron Piggush
(74) *Attorney, Agent, or Firm* — Michael Best & Friedrich LLP (57) ABSTRACT

The present invention relates to a method for connecting multiple battery cells (21) of a battery (11), wherein the multiple battery cells (21) can be connected in series to one another, and a single first control variable P1 and a single second control variable P2 are predefined for all the battery cells (21). In this context, in order to generate a desired output voltage of the battery (11), each battery cell (21) is electrically coupled to the battery (11) with a corresponding first probability, defined as a function of the first control variable P1, and in each case electrically decoupled from the battery (11) with a corresponding second probability, defined as a function of the second control variable P2. In addition, a value of the first control variable P1 and a value of the second control variable P2 are respectively predefined repeatedly with an update frequency which is dependent on (Continued)

the desired output voltage of the battery (11) which is to be generated.

10 Claims, 5 Drawing Sheets

(58) Field of Classification Search
USPC .............................. 320/116, 121, 134, 162
See application file for complete search history.

(56) References Cited

U.S. PATENT DOCUMENTS

| | | |
|---|---|---|
| 2012/0038322 A1 | 2/2012 | Moorhead et al. |
| 2014/0035361 A1 | 2/2014 | Schmidt et al. |
| 2014/0210380 A1 | 7/2014 | Butzmann |

* cited by examiner

METHOD FOR CONNECTING MULTIPLE BATTERY CELLS OF A BATTERY AND BATTERY SYSTEM HAVING A BATTERY WITH MULTIPLE BATTERY CELLS AND MULTIPLE BATTERY-CELL-MONITORING MODULES WHICH ARE RESPECTIVELY ASSIGNED TO A BATTERY CELL

BACKGROUND OF THE INVENTION

The present invention relates to a method for connecting multiple battery cells of a battery. The invention also relates to a battery system having a battery having multiple battery cells, each battery cell having a respective associated battery cell monitoring module arranged in the battery.

Figure 1:
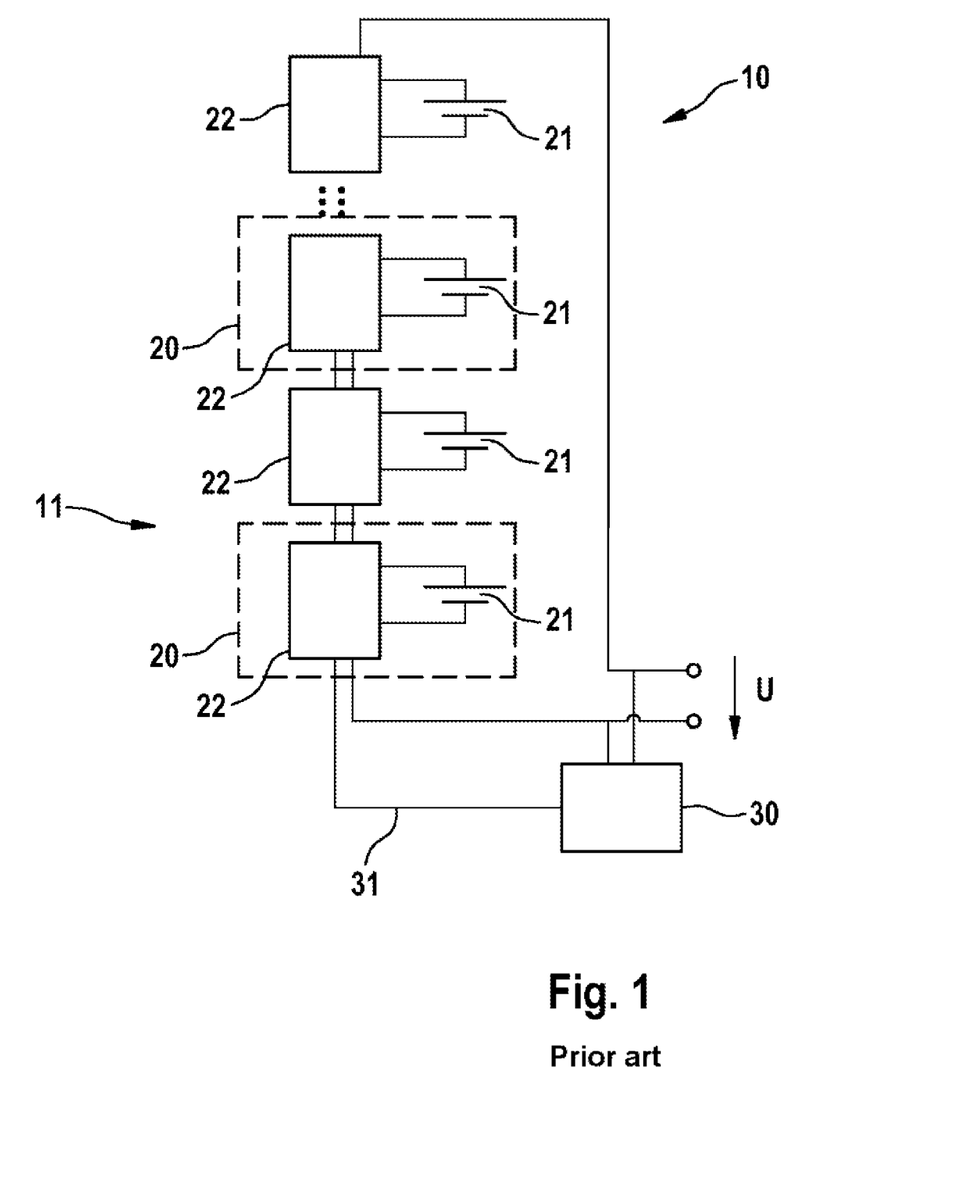
FIG. 1 is a battery system known from the prior art.

FIG. 1 depicts a battery system 10 that is known from the prior art and that comprises a battery 11 having multiple battery cell units (Smart Cell Unit SCU) 20 that each have a battery cell 21 and a battery cell monitoring module (battery cell electronics module or battery cell electronics) 22 associated with the battery cell 21. To simplify the depiction from FIG. 1, only two battery cell units are outlined and each provided with the reference symbol 20. The battery cell monitoring modules 22 allow individual control of the single battery cells 21. To produce an output voltage (total output voltage) U from the battery 11, which is also used as the output voltage U of the battery system 10, the battery cell monitoring modules 22 are connected to one another in a series circuit by means of a link. The battery system 10 further comprises a central control unit (CCU) 30 for controlling the battery system 10.

To produce a regulated output voltage (total output voltage) U from the battery 11, single battery cells 21 are each switched on by means of the associated battery cell monitoring module 22, that is to say that the battery cells 21 are each introduced into the series circuit or electrically coupled to the battery 11 in positive or negative polarity relative to the tap of the output voltage U. To produce a regulated output voltage (total output voltage) U from the battery 11, single battery cells 21 are further each switched off by means of the associated battery cell monitoring module 22, that is to say that the battery cells 21 to be switched off are isolated from the series circuit or are electrically decoupled from the battery 11 by virtue of the connection terminals of each battery cell 21 to be switched off being electrically connected by means of the associated battery cell monitoring module 22, as a result of which the applicable battery cells 21 are bypassed. The battery cells 21 connected to form the series circuit may consequently each be in a switching state referred to as "positively connected" or in a further switching state referred to as "negatively connected". Further, the battery cells 21 isolated from the series circuit are in a switching state referred to as "bypassed".

In such battery systems 10 (SmartCell battery systems), the decision about the change of switching state for the battery cells 21 is made locally in the respective battery cell monitoring modules 22. The actual regulatory function is implemented by the central control unit 30, which is in the form of a central controller, implemented with little complexity.

In this case, a first controlled variable P1 and a second controlled variable P2 are prescribed in the battery system 10 by means of a communication link 31, in the form of a unidirectional communication interface, that the central control unit 30 uses to send only a single message, which comprises the present controlled variables P1 and P2, to all battery cell monitoring modules 22. All battery cell monitoring modules 22 receive the same message and either autonomously connect the respective associated battery cells 21 of the series circuit or bypass the respective associated battery cells 21 using the applicable switches that are present in each of the battery cell monitoring modules 22 (not depicted). According to a control algorithm, the central control unit 30 prescribes the two controlled variables P1, P2 in the form of two numerical values between 0 and 1 that are transmitted via the communication link 31 from the central control unit (CCU) 30 to the battery cell monitoring modules (SCU) 22 and are equally received by all battery cell monitoring modules 22. In this case, it holds that $0 \leq P1 \leq 1$ and $0 \leq P2 \leq 1$.

Figure 2:
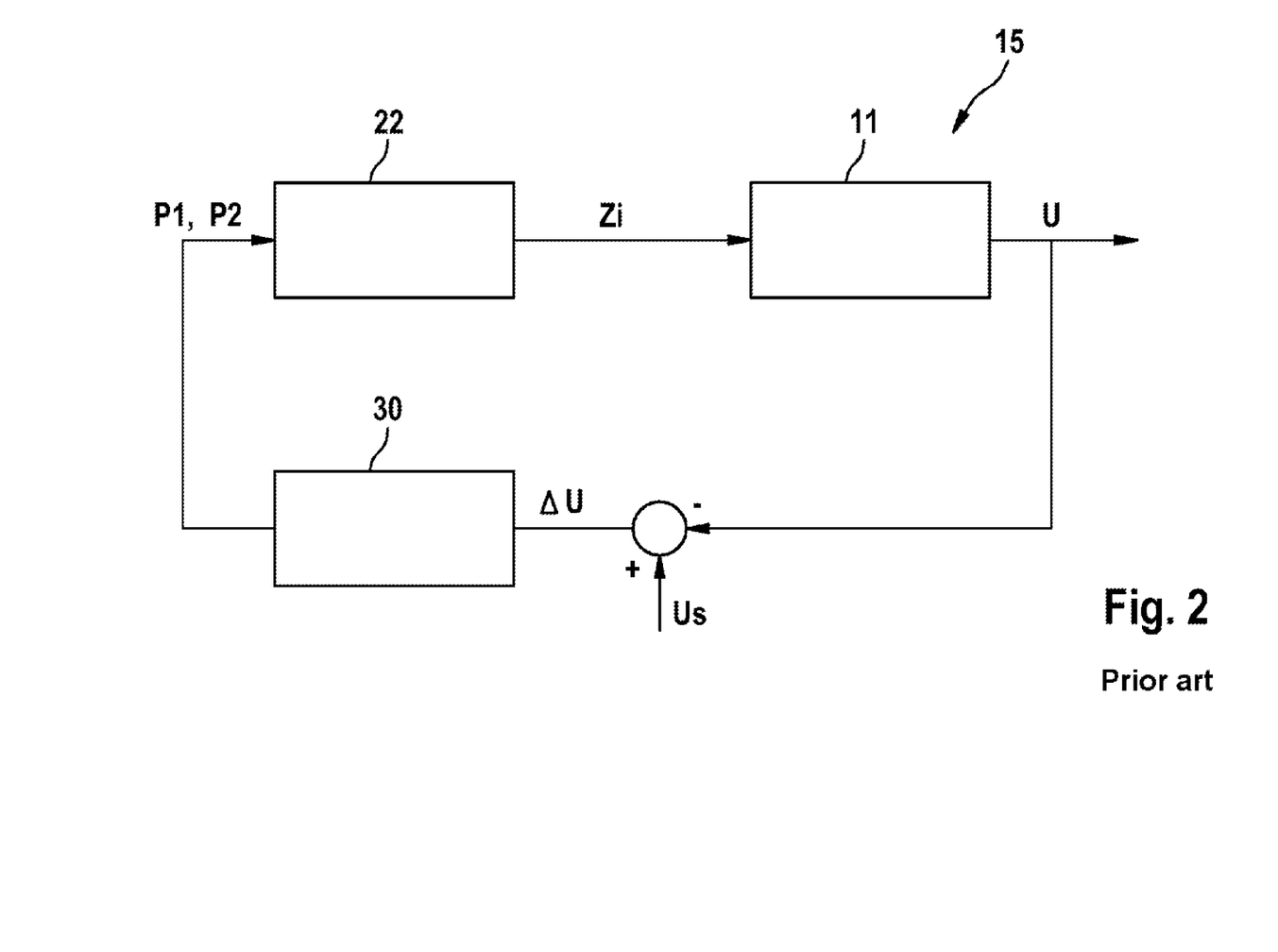
FIG. 2 is a control engineering equivalent circuit diagram for the battery system depicted in FIG. 1.

FIG. 2 shows a control engineering equivalent circuit diagram 15 for the battery system 10 that depicts production of a desired or prescribed output voltage Us of the battery 11 of the battery system 10.

FIG. 2 reveals that the central control unit 30 provides the controlled variables P1, P2 for each battery cell monitoring module 22 of the battery 11. In this case, the value of the first controlled variable P1 and the value of the second controlled variable P2 are regularly prescribed and updated by the central control unit 30 at a constant update rate or update frequency. Consequently, the first controlled variable P1 and the second controlled variable P2 are transmitted at a transmission rate or transmission frequency that is the same as the update frequency.

In this case, whenever the value of the first controlled variable P1 and the value of the second controlled variable P2 are updated, an applicable evenly distributed random process is carried out in each battery cell monitoring module 22, which random process interprets the respective present value of the first controlled variable P1 as the present value of a first probability, referred to as the switch-on probability, of the associated battery cell, when switched off, being switched on and that interprets the respective present value of the second controlled variable P2 as the present value of a second probability, referred to as the switch-off probability, of the associated battery cell 21, when switched on, being switched off. Consequently, this associated battery cell, after the applicable random process has been carried out, will remain either switched off or switched on in each case, that is to say will maintain its switching state, or be switched on or switched off, that is to say will change its switching state. The value of the currently produced output voltage U appears in each case on the basis of the switching states that the battery cells 21 of the battery 11 have after the applicable random processes are carried out. In FIG. 2, Zi denotes the switching state that the ith battery cell 21 has after an applicable random process is carried out. Further, U denotes the output voltage currently produced by the battery 11 and Us denotes the desired output voltage that is currently to be produced. In addition, ΔU denotes the existing control difference or control error between the currently produced output voltage U and the desired output voltage Us that is currently to be produced from the battery 11. In this case, the central control unit 30 tracks the controlled variables P1 and P2 such that the magnitude of said control difference or control error ΔU is as small as possible.

Figure 3:
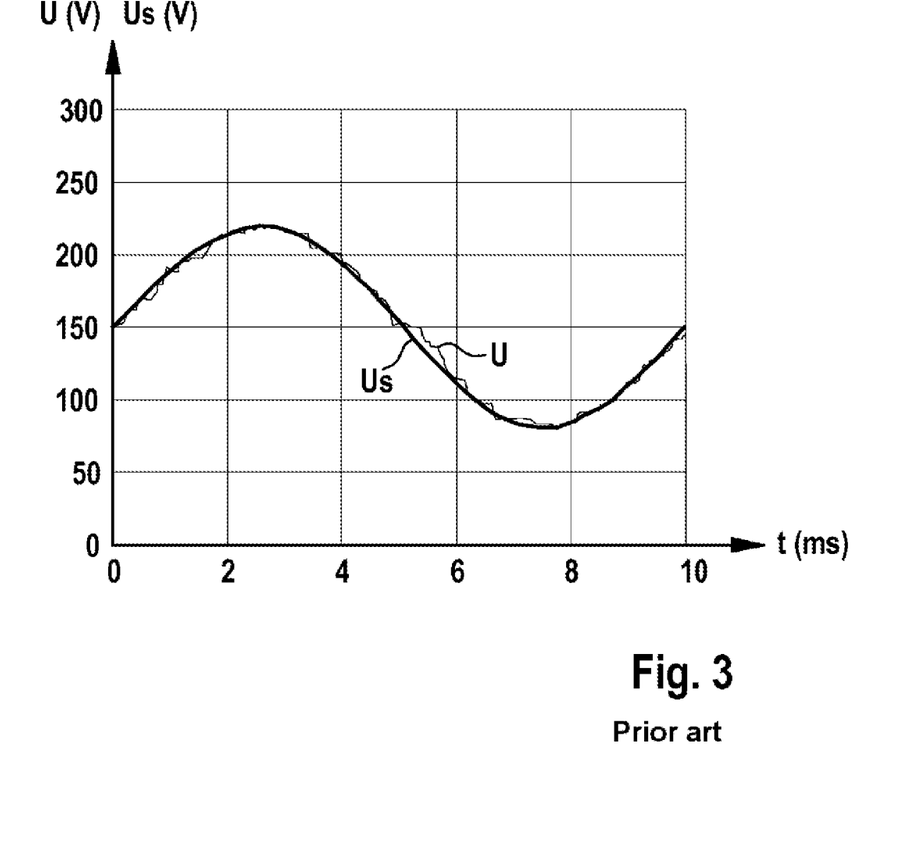
FIG. 3 is a profile, depicted as a function of a time, of a currently produced output voltage of a battery of the battery system depicted in FIG. 1 in comparison with a further profile, depicted as a function of time, of a desired output voltage to be produced from the battery of the battery system depicted in FIG. 1.

FIG. 3 shows an example of a profile of an output voltage U produced, measured in volts, as a function of a time t, measured in milliseconds, in comparison with a further profile of a desired output voltage Us, to be produced in the form of a sinusoidal AC voltage and also specified in volts, as a function of the time t. In this case, regulation of the output voltage U produced has been performed here in the same way as the regulation described in connection with FIG. 2.

Since the update frequency at which the value of the first controlled variable P1 and the value of the second controlled variable P2 are updated is the same as the transmission frequency at which the first controlled variable P1 and the second controlled variable P2 are transmitted, said update frequency is limited by the maximum transmission frequency of the transmission channel, which in this case is in the form of the communication link 31. Said transmission frequency should, however, be chosen to be as high as possible in order to obtain a low magnitude for the control error ΔU and a small time constant for regulation as cited above. This is of great significance particularly for producing a desired output voltage Us to be produced in the form of an AC voltage. To produce a sinusoidal output voltage U from the battery 11, for example, the controlled variables P1, P2 should be sent to the battery cell monitoring modules 22 repeatedly per half-cycle of the sinusoidal desired output voltage Us to be produced as applicable. To obtain as few harmonics as possible in the sinusoidal output voltage (sinusoidal oscillation) U produced from the battery 11, the update frequency at which the value of the first controlled variable P1 and the value of the second controlled variable P2 are updated is chosen to be higher than the frequency of the sinusoidal desired output voltage Us to be produced as applicable by at least a factor of 10.

A disadvantage of using a high update frequency for the value of the first controlled variable P1 and for the value of the second controlled variable P2 is that the switching state of each switched-off battery cell 21 of the battery 11 or of each switched-on battery cell 21 of the battery 11 can possibly change on receipt of each new value of the first controlled variable P1 or of the second controlled variable P2 by the respective battery cell monitoring module 22 associated therewith. The switching processes connected to such switching state changes or switching state variations cause switching losses in the power electronics that each of the applicable battery cell units 20 contain, which switching losses reduce the amount of energy that can be taken from such a battery system 10 and a corresponding battery system efficiency. In addition, these switching processes increase the requirements on cooling of the power electronics or increase the additional heating of each battery cell 21 by the applicable power electronics.

The document US 2012/0038322 A1 discloses a battery having a battery management system and having multiple battery modules, each battery module comprising multiple battery cells, an analog-to-digital converter and a switching apparatus. In this case, the battery management system is designed to set a switching rate at which the switching apparatus of each battery module specifically prompts each battery cell of the applicable battery module to communicate with the analog-to-digital converter present in the applicable battery module on the basis of at least one parameter of the applicable battery cell.

SUMMARY OF THE INVENTION

The invention provides a method for connecting multiple battery cells of a battery, wherein the multiple battery cells are connectable in series with one another and a single first controlled variable and a single second controlled variable are prescribed for all battery cells. In this case, a desired output voltage of the battery is produced by electrically coupling each battery cell to the battery with an applicable first probability, defined on the basis of a first controlled variable, and electrically decoupling each from the battery with an applicable second probability, defined on the basis of the second controlled variable. Further, a value of the first controlled variable and a value of the second controlled variable are each repeatedly prescribed at an update frequency that is dependent on the desired output voltage to be produced from the battery.

The invention further provides a battery system having a battery having multiple battery cells, wherein each battery cell has a respective associated battery cell monitoring module arranged in the battery and the multiple battery cells are connectable in series with one another by means of the associated battery cell monitoring modules. Further, a central control unit arranged in the battery system is designed to prescribe a single first controlled variable and a single second controlled variable for all battery cells and to provide said controlled variables for all battery cell monitoring modules. A desired output voltage of the battery is produced by virtue of each battery cell monitoring module being designed to electrically couple the associated battery cell to the battery with an applicable first probability, defined on the basis of the first controlled variable, and to electrically decouple said associated battery cell from the battery with an applicable second probability, defined on the basis of the second controlled variable. Further, the central control unit is designed to repeatedly prescribe a value of the first controlled variable and a value of the second controlled variable at an update frequency that is dependent on the desired output voltage to be produced from the battery.

Preferably, the value of the first controlled variable and the value of the second controlled variable are altered such that a magnitude of a control error that is defined as the difference between a currently produced output voltage of the battery and the desired output voltage to be produced from the battery is minimized.

A preferred feature of the invention is that whenever the value of the first controlled variable is updated, an applicable evenly distributed random process is carried out for each battery cell electrically decoupled from the battery, which random process interprets the present value of the first controlled variable or an applicable first variable, determined on the basis of the present value of the first controlled variable, as the probability that is currently to be used for the applicable battery cell. A further preferred feature of the invention is that whenever the value of the second controlled variable is updated, an applicable evenly distributed further random process is carried out for each battery cell electrically coupled to the battery, which further random process interprets the present value of the second controlled variable or an applicable second variable, determined on the basis of the present value of the second controlled variable, as the second probability that is currently to be used for the applicable battery cell.

The invention particularly makes use of the fact that the frequency of a sinusoidal output voltage to be produced for the operation of an electric machine, such as an asynchronous machine, for example, is dependent on the machine speed to be produced. Therefore, the frequency of the sinusoidal output voltage to be produced will not be continually at the maximum frequency value. Therefore, the invention involves a variable update frequency being used that is defined on the basis of the output voltage to be produced from a battery according to the invention and consequently also does not have to be continually at a correspondingly high update frequency value. As a result, the invention can involve a lowest possible update frequency being used for the value of the first controlled variable and for the value of the second controlled variable, which minimizes the switching losses that arise for the changes of the switching states of the battery cells of a battery according to the invention that are caused preferably by the random processes carried out as applicable. At the same time as said switching losses are minimized, it is by and large possible, according to the invention, for regulation of the currently produced output voltage of such a battery to be performed that has a control error with a low magnitude and a small time constant.

A feature of an advantageous embodiment of the invention is that the update frequency is dependent on the control error and/or on a frequency of an, in particular sinusoidal, AC voltage to be produced as the desired output voltage of the battery.

A feature of a further very advantageous embodiment of the invention is that the update frequency is a monotonously rising, in particular linear, function of the magnitude of the control error and/or is a monotonously rising, in particular linear, further function of the frequency of the, in particular sinusoidal, AC voltage to be produced as the desired output voltage of the battery.

Consequently, a feature of the invention is that the update frequency for the value of the first controlled variable and for the value of the second controlled variable is preferably defined on the basis of the control error, that is to say on the basis of a difference between a prescribed setpoint value for the output voltage of the battery according to the invention and a present value of the output voltage of the battery according to the invention. As a further preference, the update frequency according to the invention is a monotonously rising, in particular linear, function of the magnitude of the control error. The effect achieved by this is that if the magnitude of said control error is large, then the update frequency according to the invention is increased in order to bring about changes to the switching states of the battery cells of the battery according to the invention as quickly as possible, owing to which the magnitude of the control error decreases. If the magnitude of the control error is already small, however, then the update frequency according to the invention is decreased in order to avoid unnecessary changes to the switching states of the battery cells at the battery according to the invention and the associated switching losses.

Preferably, the update frequency according to the invention does not exceed a maximum update frequency limit value. In this case, the maximum update frequency limit value is the same as a maximum transmission frequency of a transmission channel used for transmitting the value of the first controlled variable and the value of the second controlled variable. As a further preference, the update frequency according to the invention does not fall below a minimum update frequency limit value. In this case, a minimum update frequency limit value is used that is such that a rate of change of the switching state, which is defined as the quotient between a number of switching state changes, obtained as the sum of a number of battery cells from the multiple battery cells that are electrically coupled to the battery within a predefined period and a further number of battery cells from the multiple battery cells that are electrically decoupled from the battery within the predefined period, and a length of the predefined period, does not fall below a minimum limit value for the rate of change of the switching state.

Consequently, the update frequency used according to the invention for the value of the first controlled variable and for the value of the second controlled variable is preferably limited by the maximum transmission rate of the transmission channel used for transmitting the value of the first controlled variable and the value of the second controlled variable. In addition, the invention allows a minimum update frequency to be defined that can be used to ensure that a minimum number of changes to the switching states of the battery cells of the battery according to the invention takes place and, as a result, also that the battery cells of the battery according to the invention or the battery cell units of the battery according to the invention, which are each formed from a battery cell and a battery cell monitoring module associated with this battery cell, are evenly loaded.

BRIEF DESCRIPTION OF THE DRAWINGS

Exemplary embodiments of the invention are described in detail below with reference to the accompanying drawings. Like components also have the same reference symbols used for them. In the drawings.

DETAILED DESCRIPTION

Figure 4:
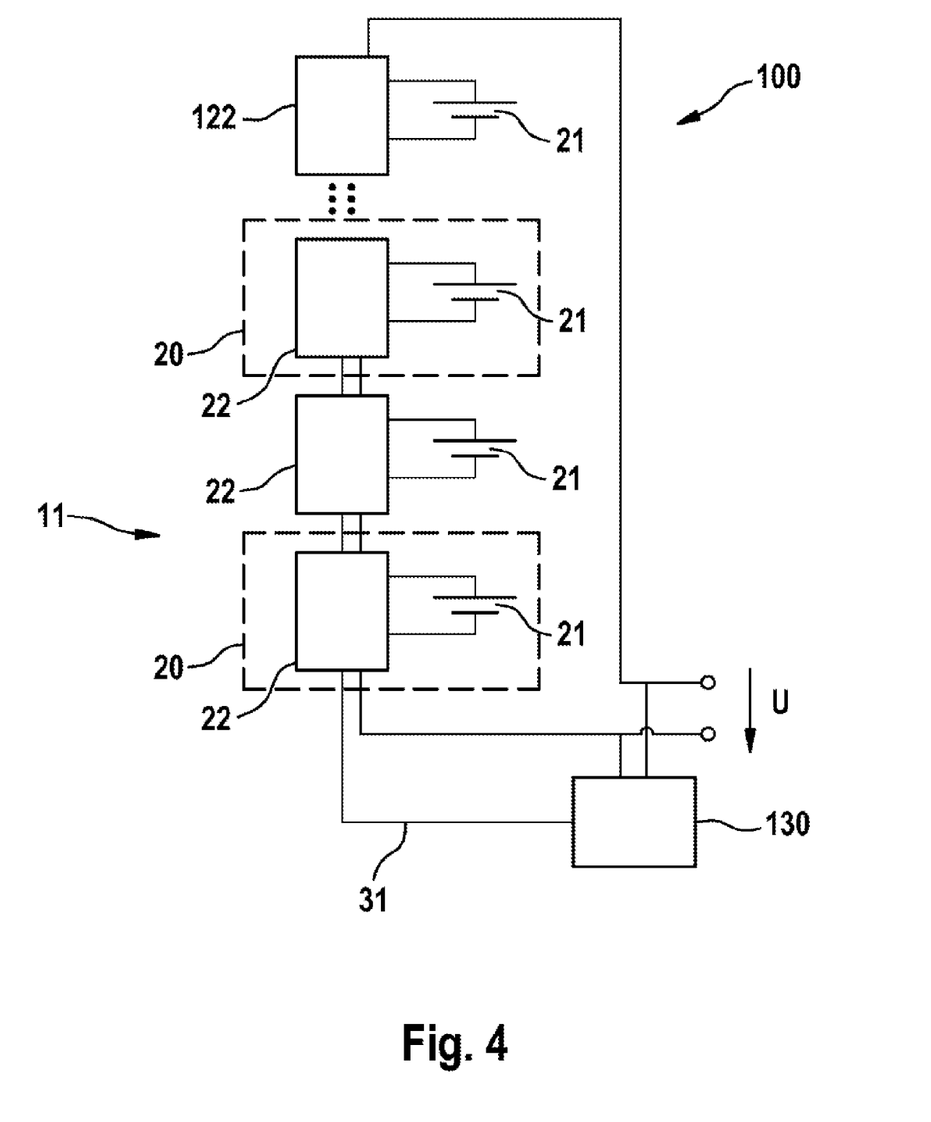
FIG. 4 is a battery system according to a first embodiment of the invention.

FIG. 4 shows a battery system 100 according to the invention based on a first embodiment of the invention. Like the battery system depicted in FIG. 1 and known from the prior art, the battery system 100 according to the invention comprises a battery 11 having multiple battery cell units 20 that each comprise a battery cell 21 and a battery cell monitoring module 22 associated with the battery cell 21. In this case too, the multiple battery cells 21 are connectable in series with one another by means of the associated battery cell monitoring modules 22. Further, a central control unit 130 of the battery system 100 according to the invention is also designed to provide controlled variables P1, P2 of each battery cell monitoring module 22 of the battery 11 via a transmission channel in the form of the communication link 31 and to alter the value of the first controlled variable P1 and the value of the second controlled variable P2 such that a magnitude of a control error that is defined as a difference between a currently produced output voltage U of the battery 11 and a desired output voltage Us to be produced from the battery 11 of the battery system 100 according to the invention is minimized.

Unlike in the case of the battery system depicted in FIG. 1, the value of the first controlled variable P1 and the value of the second controlled variable P2 are repeatedly prescribed by the central control unit 130 of the battery system 100 according to the invention at a variable update frequency. Further, the central control unit 130 of the battery system 100 according to the invention is designed to use an update frequency that is a monotonously rising, linear function of the magnitude of said control error.

Even in the case of the battery system 100 according to the invention, each battery cell monitoring module 22 is designed to carry out an applicable evenly distributed random process that interprets the respective present value of the first controlled variable P1 as the present value of a first probability of the associated battery cell 21, when electrically decoupled from the battery 11, being electrically coupled to the battery 11 and that interprets the respective present value of P2 as the present value of a second probability of the associated battery cell 21, when electrically coupled to the battery 11, being electrically decoupled from the battery 11.

Figure 5:
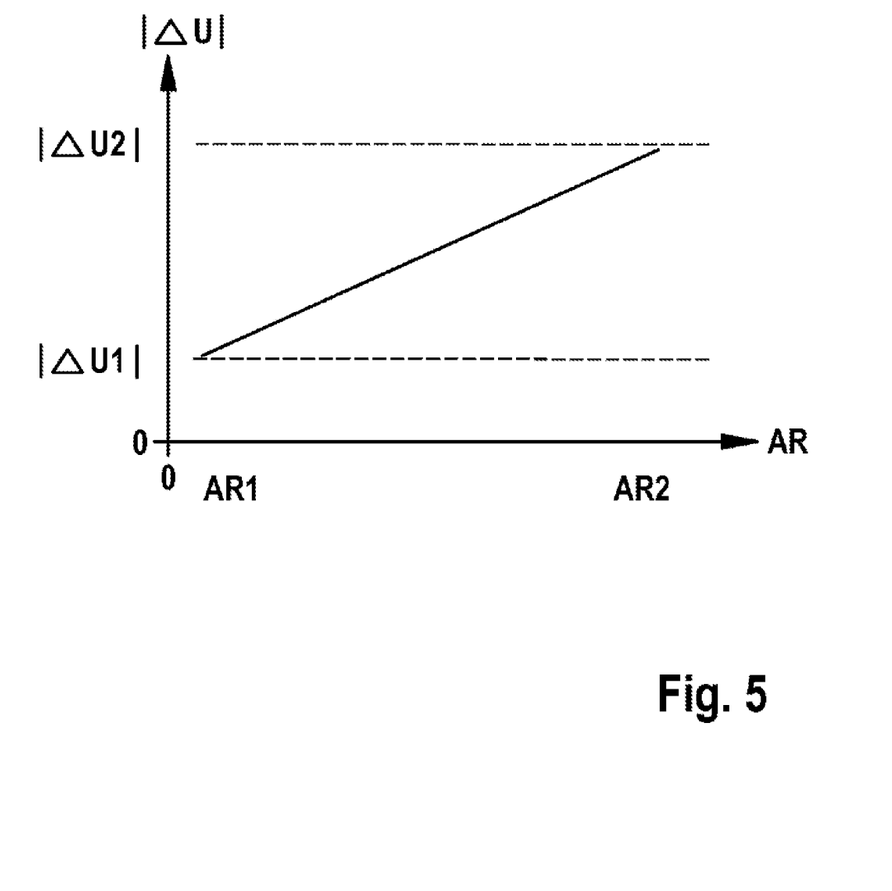
FIG. 5 is a dependency between a magnitude of a control error and an update frequency of a value of a first controlled variable and a second controlled variable, wherein the control error is predefined as a difference between a currently produced output voltage of a battery of the battery system depicted in FIG. 4 and an output voltage to be produced from said battery and wherein each battery cell of this battery is electrically coupled to the applicable battery on the basis of the first controlled variable and is electrically decoupled from the applicable battery on the basis of the second controlled variable.

FIG. 5 shows a linear dependency between a variable update frequency AR used by the control unit 130 of the battery system 100 according to the invention and the magnitude $|\Delta U|$ of the aforementioned control error $\Delta U$. FIG. 5 reveals that when the magnitude of the control error $\Delta U$ changes between a minimum magnitude value $|\Delta U1|$ of the control error $\Delta U$ and a maximum magnitude value $|\Delta U2|$ of the control error $\Delta U$, the update rate AR changes between a minimum update rate value AR1 and a maximum update rate value AR2. In this case, the magnitude $|\Delta U|$ of the control error $\Delta U$ is a linear monotonously rising function of the update frequency AR.

Besides the written disclosure above, reference is hereby additionally made to the depiction in FIGS. 4 and 5 for further disclosure of the invention.

The invention claimed is:

1. A method for connecting multiple battery cells (21) of a battery (11), wherein the multiple battery cells (21) are connectable in series with one another and a single first controlled variable P1 and a single second controlled variable P2 are prescribed for all battery cells (21), the method comprising:
   determining, via an electrical control unit, an update frequency (AR) based on a frequency of an AC voltage to be produced as the desired output voltage (Us) of the battery (11),
   determining, via the electrical control unit, the first controlled variable P1 based upon the update frequency (AR),
   determining, via the electrical control unit, the second controlled variable P2 based upon the update frequency (AR),
   determining, via an electrical battery cell monitoring module, which of the multiple battery cells (21) are to be electrically coupled to the battery (11) based upon a first random process and the first controlled variable P1,
   determining, via the electrical battery cell monitoring module, which of the multiple battery cells (21) are to be electrically decoupled from the battery (11) based upon a second random process and the second controlled variable P2, and
   producing a desired output voltage (Us) of the battery (11) based upon which of the multiple battery cells (21) are electrically coupled to the battery (11).

2. The method as claimed in claim 1, wherein the value of the first controlled variable P1 and the value of the second controlled variable P2 are altered via the electrical control unit such that a magnitude ($|\Delta U|$) of a control error ($\Delta U$) that is defined as the difference between a currently produced output voltage (U) of the battery (11) and the desired output voltage (Us) to be produced from the battery (11) is minimized.

3. The method as claimed in claim 2, wherein the update frequency (AR) is further dependent on the control error $\Delta U$.

4. The method as claimed in claim 2, wherein the update frequency (AR) is a monotonously rising function of the magnitude ($|\Delta U|$) of the control error $\Delta U$, is a monotonously rising function of the frequency of the AC voltage to be produced as the desired output voltage (Us) of the battery (11), or both.

5. The method as claimed in claim 1, wherein the update frequency (AR) does not exceed a maximum update frequency limit value, which is the same as a maximum transmission frequency of a transmission channel (31) used for transmitting the value of the first controlled variable P1 and the value of the second controlled variable P2, does not fall below a minimum update frequency limit value, or both and wherein a minimum update frequency limit value is used that is such that a rate of change of the switching state, which is defined as the quotient between a number of switching state changes, obtained as the sum of a number of battery cells (21) from the multiple battery cells (21) that are electrically coupled to the battery (11) within a predefined period and a further number of battery cells (21) from the multiple battery cells (21) that are electrically decoupled from the battery (11) within the predefined period, and a length of the predefined period, does not fall below a minimum limit value for the rate of change of the switching state.

6. A battery system (100) having a battery (11) having multiple battery cells, wherein each battery cell (21) has a respective associated electrical battery cell monitoring module (22) arranged in the battery (11) and the multiple battery cells (21) are connectable in series with one another by means of the associated electrical battery cell monitoring modules (22), and an electrical control unit (130) arranged in the battery system (100), the electrical control unit configured to prescribe a single first controlled variable P1 and a single second controlled variable P2 for all battery cells (21) and to provide said controlled variables for all electrical battery cell monitoring modules (22), wherein the electrical control unit (130) is designed to repeatedly prescribe a value of the first controlled variable P1 and a value of the second controlled variable P2 at an update frequency (AR) that is based on a frequency of an AC voltage to be produced as a desired output voltage (Us) of the battery (11), and wherein the desired output voltage (Us) of the battery (11) is produced by virtue of each electrical battery cell monitoring module (22) being designed to electrically couple the associated battery cell (21) to the battery (11) based upon a first random process and the first controlled variable P1 and to electrically decouple said associated battery cell from the battery (11) based upon a second random process and the second controlled variable P2.

7. The battery system (100) as claimed in claim 6, wherein the electrical control unit (130) is further designed to alter the value of the first controlled variable P1 and the value of the second controlled variable P2 such that a magnitude ($|\Delta U|$) of a control error ($\Delta U$) that is defined as the difference between a currently produced output voltage (U) of the battery (11) and the desired output voltage (Us) to be produced from the battery (11) is minimized.

8. The battery system (100) as claimed in claim 6, wherein the update frequency (AR) used by the electrical control unit (130) is further dependent on the control error (ΔU).

9. The battery system (100) as claimed in claim 6, wherein the update frequency (AR) used by the electrical control unit (130) is further a monotonously rising, function of the magnitude (|ΔU|) of the control error (ΔU), a monotonously rising function of the frequency of the AC voltage to be produced as the desired output voltage (Us) of the battery (11), or both.

10. The battery system as claimed in claim 6, wherein the update frequency (AR) used by the electrical control unit (130) does not exceed a maximum update frequency limit value, which is the same as a maximum transmission frequency of a transmission channel (31) used for transmitting the value of the first controlled variable P1 and the value of the second controlled variable P2, does not fall below a minimum update frequency limit value, or both, wherein the control unit (130) is designed to use a minimum update frequency limit value that is such that a rate of change of the switching state, which is defined as the quotient between a number of switching state changes, obtained as the sum of a number of battery cells (21) from the multiple battery cells (21) that are electrically coupled to the battery (11) within a predefined period and a further number of battery cells (21) from the multiple battery cells (21) that are electrically decoupled from the battery (11) within the predefined period, and a length of the predefined period, does not fall below a minimum limit value for the rate of change of the switching state.

* * * * *